Patented Jan. 5, 1926.

1,568,350

UNITED STATES PATENT OFFICE.

DAVID TAYLOR, OF DENVER, COLORADO.

PAINT.

No Drawing.   Application filed October 6, 1924. Serial No. 742,066.

*To all whom it may concern:*

Be it known that I, DAVID TAYLOR, a citizen of the United States, residing at Denver, the city and county of Denver and State of Colorado, have invented certain new and useful Improvements in Paints; and I do declare the following to be a full, clear, and exact description of the invention, such as will enable others skilled in the art to which it appertains to make and use the same.

This invention relates to improvements in paints and has special reference to paints to be used on all outside exposed metal works and in places exposed to gas or acid fumes.

Those versed in the art of painting know that the paints used at present do not last when exposed to the elements or to acid fumes. This is especially true where the paint is used on outside metal surfaces where rust takes place and deteriorates the paint.

I have found that a paint prepared in accordance with the following formula will resist acid, gas and the elements to a greater extent than any other paint known to me and is especially adapted to be used on all outside and exposed metal surfaces, as it resists and prevents rust.

My improved paint is made in accordance with the following formula:

|  | Per cent. |
|---|---|
| Linseed oil | 11 1/9 |
| Red lead | 16 2/3 |
| Mineral red | 16 2/3 |
| Cement (Portland) | 2 5/9 |
| Asbestos powder | 1 2/3 |
| Turpentine | 2 |
| Zinc | 1 1/3 |
| Chill room paint | 48 |

These ingredients are mixed and thoroughly stirred so as to form a thorough mixture.

By mineral red is meant red pigment of an inorganic nature such as Indian red and Venetian red as distinguished from red pigments of organic origin such as the lakes.

The part referred to as chill room paint is a mixture compounded in accordance with the following formula:

The pigments are composed of the following:

|  | Per cent. |
|---|---|
| Lithopone | 55 |
| Zinc oxide | 40 |
| Silica | 5 | while the vehicle consists of the following ingredients mixed, as follows:

|  | Per cent. |
|---|---|
| Vegetable oil | 43 |
| Rosin oil | 46 |
| Petroleum spirits | 11 |

The pigments and vehicle are mixed in the following proportions:

|  | Per cent. |
|---|---|
| Pigments | 46.6 |
| Vehicle | 53.4 |

This mixture is then added to the formula given above in the proportion indicated.

Having now described my invention, what I claim as new is:

A paint, comprising, in combination, linseed oil, a lead compound, asbestos powder, Portland cement, zinc and chill room paint.

In testimony whereof I affix my signature.

DAVID TAYLOR.